United States Patent
Takizawa

(10) Patent No.: US 7,844,393 B2
(45) Date of Patent: Nov. 30, 2010

(54) VEHICLE NAVIGATION SYSTEM AND METHOD

(75) Inventor: Akihiko Takizawa, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 1250 days.

(21) Appl. No.: 10/845,488

(22) Filed: May 13, 2004

(65) Prior Publication Data

US 2004/0267447 A1    Dec. 30, 2004

(30) Foreign Application Priority Data

May 15, 2003    (JP) .............................. 2003-137150

(51) Int. Cl.
  *G06F 19/00* (2006.01)
(52) U.S. Cl. ........................ 701/201; 701/209; 340/988; 340/995
(58) Field of Classification Search ................. 701/201, 701/209, 207, 210, 211, 208, 200, 203, 206; 340/988, 995, 990
See application file for complete search history.

(56) References Cited

U.S. PATENT DOCUMENTS

| | | | |
|---|---|---|---|
| 5,926,118 A | * | 7/1999 | Hayashida et al. ..... 340/995.21 |
| 6,018,697 A | * | 1/2000 | Morimoto et al. ........... 701/209 |
| 6,047,235 A | * | 4/2000 | Hiyokawa et al. ........... 701/201 |
| 6,070,124 A | * | 5/2000 | Nimura et al. ............... 701/211 |
| 6,584,402 B2 | * | 6/2003 | Fukushima et al. ......... 701/202 |
| 6,636,806 B1 | | 10/2003 | Irie |

FOREIGN PATENT DOCUMENTS

| | | |
|---|---|---|
| JP | 04-098500 | 3/1992 |
| JP | 08-138196 | 5/1996 |
| JP | 09-113297 | 5/1997 |
| JP | 10-089981 | 4/1998 |
| JP | 11-142176 | 5/1999 |
| JP | 2002-340585 | 11/2002 |

* cited by examiner

Primary Examiner—Ronnie Mancho
(74) Attorney, Agent, or Firm—Brinks Hofer Gilson & Lione

(57) ABSTRACT

Route guidance is provided for traveling to a lane opposite to a present traveling lane. If a user operates a return button, a main control unit calculates a position closest to a present position in a lane of the traveling direction opposite to that of a present traveling lane on a present traveling path as a destination, and sets the destination to destination data. Then, the route search unit searches for a guide route to the destination indicated by the destination data. A navigation image indicating the searched guide route along with the present position and the destination is displayed.

21 Claims, 7 Drawing Sheets

VEHICLE NAVIGATION SYSTEM AND METHOD

BACKGROUND OF THE INVENTION

1. Field of the Invention

The present invention relates to a navigation system and method providing route guidance to a user.

2. Description of the Related Art

As widely used related art for providing a user with route guidance on a navigation system installed in a vehicle, a conventional system receives a destination as a point on a map specified by a user, or a position selected from a list of candidate destination positions registered in advance, sets a guidance route to the received destination, and displays the set guidance route on a map thereby guiding travel along the guidance route.

As related art of setting a guidance route on this type of onboard navigation system, known systems prefer a route which does not cross a lane opposite to a traveling lane, or does not make a U-turn into the opposite lane (See, for example, Japanese Patent Laid-Open Publication No. H6-102051, and Japanese Patent Laid-Open Publication No. H9-210711).

When a user is receiving travel guidance along the guidance route as described above, or the user is not receiving travel guidance, there are often cases that the user wants to move into a lane opposite to a present traveling lane, and to drive back on the path along which the user has just been traveling. These include a case where the user has traveled straight at an intersection at which the user should have turned left or right, and wants to return to the intersection at which the user should have turned left or right; and a case where the user is traveling on an expressway, has passed an exit of the expressway at which the user should have exited to a local road, and wants to return to that exit of the expressway. These also include a case where when the user is traveling while looking for a gas station, the user finds a gas station on the side of the opposite lane, but the user cannot enter the gas station crossing the opposite lane at that position due to a center strip; and a case where the user changes his or her mind, and wants to return to a restaurant after the user has passed that restaurant.

In these cases, though it may be contemplated that the user makes the vehicle U-turn from the traveling lane to the opposite lane, and travels back on the path along which the user has just been traveling, a complicated operation such as driving the vehicle into a clear space on the roadside, turning the vehicle around, and then entering the path by making a turn is necessary to make a U-turn except for a case where a dedicated path for a U-turn is provided. In addition, such a drive operation increases the stress of an ordinary user. Further, it may be impossible to make a U-turn depending on the traveling lane and the surrounding conditions.

On the other hand, instead of making the vehicle U-turn directly from the present traveling lane to the opposite lane, it may be contemplated to drive back on the path along which the user has just been traveling by driving the vehicle while making left and right turns using other paths, thereby moving into the lane opposite to the present traveling lane.

Consequently, in this case, the following problems occur if a user receives travel guidance from the onboard navigation system for a route from a present traveling lane to the opposite lane on a present driving path according to the conventional travel guidance following a guide route.

Namely, though it is first necessary to set a destination to a position on the lane opposite to the present traveling lane on the present traveling path for the user to receive such travel guidance, it is difficult to immediately set the destination by specifying a point on a map. In addition, the user cannot expect that such a position is registered on the list of destination candidates in advance.

Further, when the user sets a destination around the present position to move into the lane opposite to the present traveling lane on the present traveling path, since the present position and the destination are close to each other, the onboard navigation system determines that the vehicle has arrived at the destination, and does not set a guide route as the user expects. Even if the guide route is set, the onboard navigation system determines that the vehicle has arrived at the destination after the start of the route guidance, and terminates the route guidance even if the vehicle has not moved into the lane opposite to the present traveling lane.

SUMMARY OF THE INVENTION

An object of the present invention is to guide a user along a route for moving into a lane opposite to a present traveling lane without requiring a complicated operation by the user.

To achieve the above-described object, an onboard navigation system according to the present invention is comprised of a guidance request reception unit for receiving a return route guidance request operation of a user, a return route calculation unit for calculating a route from a present position to a position on a lane in a traveling direction opposite to that of a present traveling lane on a present traveling path as a return guide route when the guidance request reception unit receives the return route guidance request operation, and a return route guidance unit for guiding the travel of the user according to the return guide route calculated by the return route calculation unit.

According to this onboard navigation system, when the user simply carries out the predetermined return route guidance request operation, the onboard navigation system automatically starts a route search to the position on the lane in the traveling direction opposite to that of the present traveling lane on the present traveling path, and then provides travel guidance according to the searched route.

Therefore, the user can immediately receive route guidance for a route traveling only on the present traveling lane and the lane in the opposite direction without a complicated operation, such as selecting the position on the lane in the traveling direction opposite to that of the present traveling lane on the present traveling path on the map as a destination.

On the onboard navigation system, it is preferable for increasing the operability for the user that an input apparatus of the onboard navigation system comprises a button for entering the return route guidance request operation of the user, and the guidance request reception unit receives the return route guidance request operation by the user according to the operation of the button by the user.

In addition, on the onboard navigation system, the return route calculation unit may comprise a return destination setting unit for setting a position closest to the present position in the lane of the traveling direction opposite to that of the present traveling lane as a return destination when the guidance request reception unit receives the return route guidance request operation, and a return route search unit for calculating a route to the return destination set by the return destination setting unit as the return guide route. Further, in this case, the route guidance unit may continue providing travel guidance to the user according to the return guide route calculated by the return route calculation unit until the distance between the present position and the return destination set by the return destination setting unit is equal to or less than a predetermined distance, and simultaneously, the present position is a position in the lane on which the return destination is set. In this way, it is possible to avoid a case where if the position closest to the present position is set to the return destination, since the return destination and the present position are close to each other, the onboard navigation system determines that the vehicle reaches the return destination and terminates the route guidance before the vehicle actually moves into the lane on which the return destination is set.

In addition, in the onboard navigation system, the return route calculation unit may comprise a return destination setting unit for setting the last intersection passed on the present traveling path as a return destination when the guidance request reception unit receives the return route guidance request operation, and a return route search unit for calculating a route to the return destination set by the return destination setting unit as the return guide route. Alternatively, in the onboard navigation system, the return route calculation unit may be comprised of a return destination setting unit for setting a position in the lane of the traveling direction opposite to that of the present traveling lane before the last intersection passed on the present traveling path as a return destination when the guidance request reception unit receives the return route guidance request operation, and a return route search unit for calculating a route to the return destination set by the return destination setting unit as the return guide route. Still alternatively, in the onboard navigation system, the return route calculation unit may comprise a return destination setting unit for setting the last exit passed on a present traveling expressway as a return destination during travel on an expressway when the guidance request reception unit receives the return route guidance request operation, and a return route search unit for calculating a route to the return destination set by the return destination setting unit as the return guide route.

Additionally, if the above-described onboard navigation system comprises a route guidance unit for searching for a route from the present position to a destination set by the user as a guide route, and guiding the travel of the user according to the searched guide route, it is preferable to provide a destination restoration processing unit for stopping the travel guidance by the route guidance unit after storing the destination set by the user if the guidance request reception unit receives the return route guidance request operation while the route guidance unit is carrying out the travel guidance according to the guide route, and for causing the route guidance unit to search for a guide route from the present position to the stored destination, and to carry out the travel guidance for the user according to the searched guide route after completion of the travel guidance for the user according to the return guide route by the return route guidance unit.

Still additionally, it is preferable to provide a destination restoration processing unit for stopping the travel guidance by the route guidance unit after storing the destination set by the user if the guidance request reception unit receives the return route guidance request operation while the route guidance unit is carrying out the travel guidance according to the guide route, and for causing the route guidance unit to search for a guide route from the present position to the stored destination, and to carry out the travel guidance for the user according to the searched guide route if a request for restoration of the destination is received from the user after stopping the travel guidance by the route guidance unit.

According to the onboard navigation system provided with the destination restoration processing unit described above, in such a case where the user wants to temporarily stop at a facility on the side of a lane opposite to a traveling lane while receiving travel guidance for a route to a final destination, after moving into the opposite lane while receiving route guidance to the opposite lane, the user can receive the route guidance to the final destination again without resetting the final destination.

DETAILED DESCRIPTION OF THE PREFERRED EMBODIMENTS

A description will now be given of embodiments of the present invention.

Figure 1:
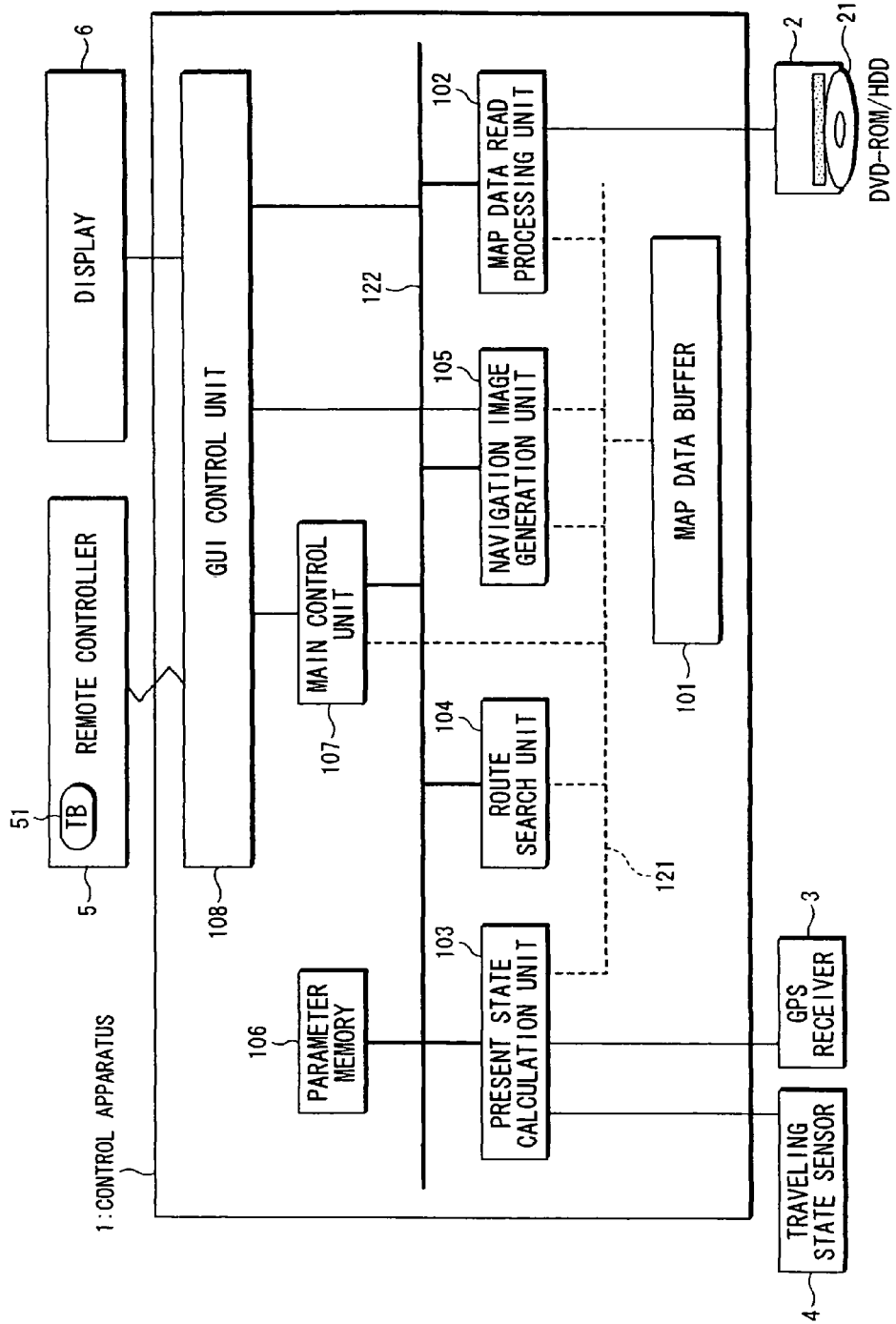
FIG. 1 is a block diagram showing the configuration of an onboard vehicle navigation system according to an embodiment of the present invention.

FIG. 1 shows the configuration of an onboard vehicle navigation system according to a present embodiment.

As the figure shows, the onboard navigation system comprises a control apparatus 1, a recording medium drive 2 having access to a recording medium 21 such as a DVD-ROM or a hard disk storing map data, a GPS receiver 3, a traveling state sensor 4 for detecting a traveling state of a vehicle such as an angular acceleration sensor or a vehicle speed sensor, a remote controller 5 for receiving an input from a user, and a display 6. The remote controller 5 is provided with a return button 51 for receiving an instruction from a user for starting route guidance to a position in a lane of a traveling direction opposite to that of a present traveling lane on a present traveling path.

The control apparatus 1 is provided with a map data buffer 101, a map data read processing unit 102, a present state calculation unit 103, a route search unit 104, a navigation image generation unit 105, a parameter memory 106, a main control unit 107, and a GUI control unit 108. In FIG. 1, dotted lines 121 indicate access paths to respective parts of map data stored in the map data buffer 101, and bold lines indicate paths of control information and various types of data between the respective units inside the control apparatus 1, and thin lines connected to the GUI control section 108 indicate paths of operation information and image information input/output from/to the user through the remote controller 5 and the display 6.

It should be noted that the control apparatus 1 may be a CPU circuit having a general configuration including a microprocessor, a memory, and other peripheral devices such as a graphic processor and a geometric processor in terms of hardware, and in this case, the above-described respective units of the control apparatus 1 may be processes realized by the microprocessor executing programs provided in advance.

Additionally, in this case, this program may be provided for the control apparatus 1 through the recording medium 21 or an appropriate communication line.

A description will now be given of the format of the map data stored on the recording medium 21.

In this format, the map data is managed in predetermined respective geographical areas as a unit referred to as map sheet, and the respective map sheets are organized as a plurality of levels corresponding to the detail of maps. A map at the respective level of the respective map sheets is comprised of one or more units, and the respective unit corresponds to a geographical area or an area which is a division of this geographical area of a map sheet to which this unit belongs, and represents a map of the corresponding area at the level to which this unit belongs.

Figure 2:
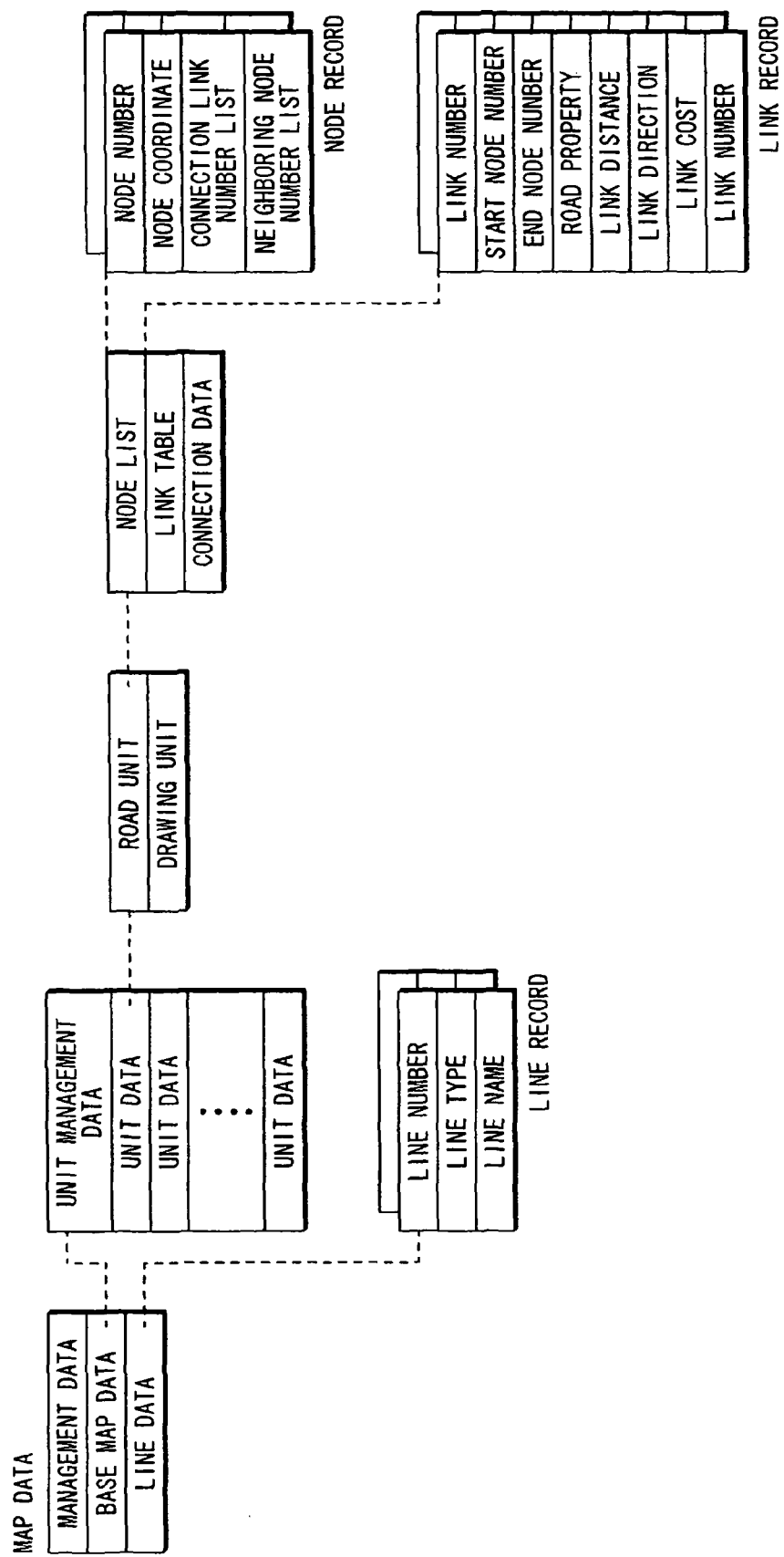
FIG. 2 shows the contents of map data according to the embodiment of the present invention.

As FIG. 2 shows, the map data includes management data describing relationships between respective units and a map sheet, the respective units and corresponding areas, and the respective units and levels, base map data representing a map, and line data.

The base map data include unit data for above-described respective units, and unit management data describing relationships between the respective unit data and the map sheet, the respective unit data and the corresponding areas, and the respective unit data and the levels. The respective unit data include a road unit representing a road network inside the unit, and a drawing unit providing a map inside the unit to be displayed.

The road unit includes a node list, a link table, and connection data describing connection and correspondence of nodes and links to other units.

The road unit represents a road as a set of links which are straight lines, and end points of the respective links are nodes. These nodes are always provided at connection points of roads such as intersections as well as at boundaries to neighboring units. The respective links have a direction, and between two nodes neighboring each other through a link(s), only one link is provided if the road is one-way, and two links opposite to each other are generally provided if the road is two-way.

The node list includes node records for the respective nodes, and the respective node records include a node number, a node coordinate, a node property indicating whether the subject node corresponds to an intersection or an entrance/exit of an expressway, and the like, a connected link number list which is a list of link numbers of links connected to the subject node, and neighboring node number list which is a list of node numbers of nodes neighboring the subject node through the links.

The link table includes link records for the respective links, and the respective link records include a link number, a start node number indicating the node number of a node which is a start point of the subject link, an end node number indicating the node number of a node which is an end point of the subject link, a road property indicating various types of information on a section of a road corresponding to the subject link, the distance of the subject link, the direction of the subject link, a link cost which is a cost for route search assigned to the subject link, a line number of a line to which the subject link belongs, and the like. As the road property, there are described the type of the road to which the subject link belongs such as a toll road, and a national road or a prefectural road, the road width, the number of lanes, and the existence of a center strip of the road section to which the subject link corresponds, identification whether the subject link is a lane used for a U-turn, and the like.

The drawing unit provides geographical display elements of a map such as map graphics, road graphics, and facility graphics, character information displayed on the map such as area names and facility names, and facility marks displayed for indicating the existence of facilities such as a gas station on the map.

Finally, the line (path) data contained in the map data include line records provided for the respective lines, and the respective line records include a line number which is an identifier of a road, a line type of the respective road such as an express way, a national road, and a prefectural road, and a line name of the respective road.

A description will now be given of parameters stored in the parameter memory 106 of the control apparatus 1 in FIG. 1.

Figure 3:
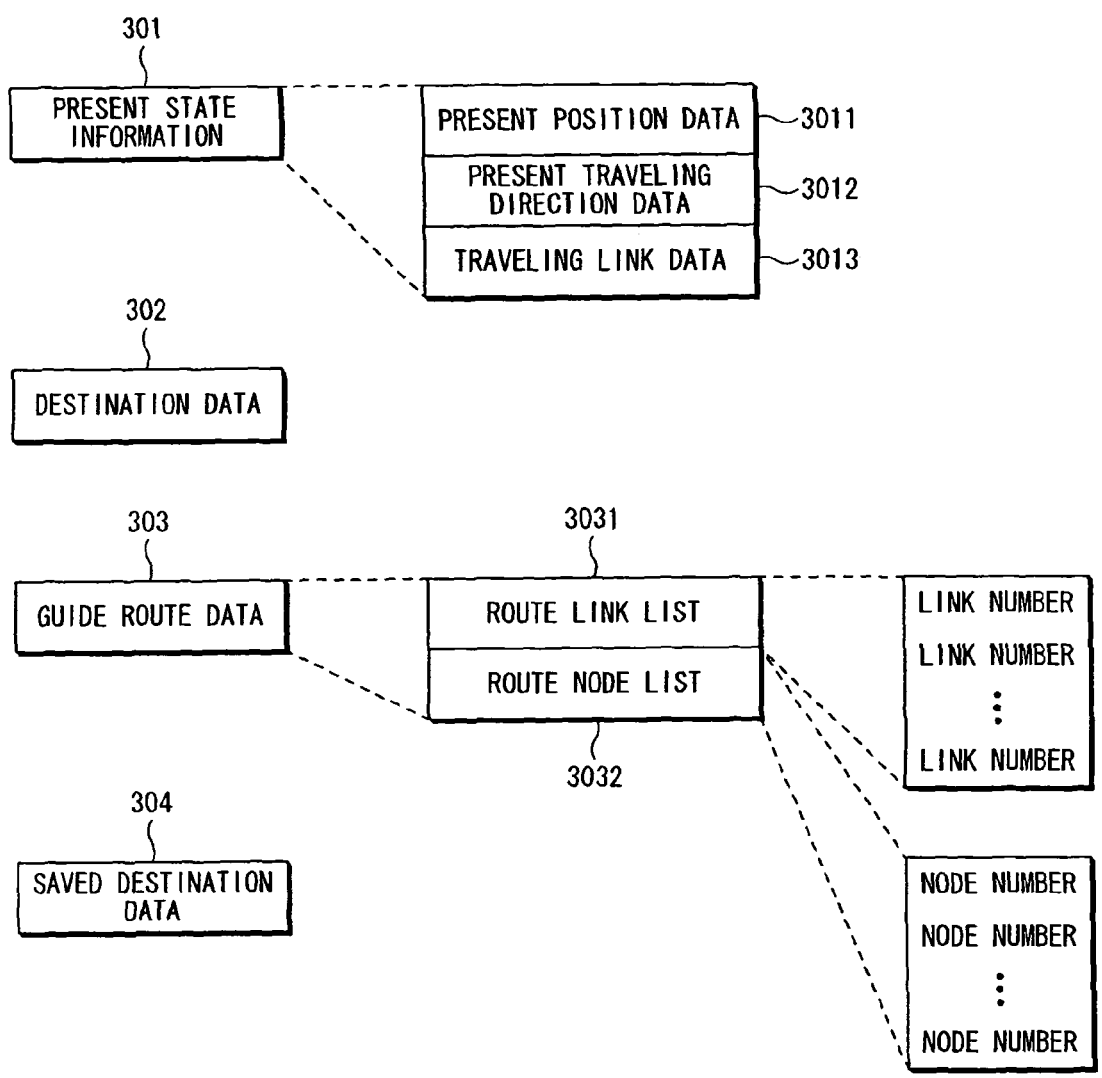
FIG. 3 shows the contents of a parameter memory according to the embodiment of the present invention.

As FIG. 3 shows, the parameter memory 106 stores present state information 301, destination data 302, guide route data 303, and saved destination data 304.

The present state information 301 includes present position data 3011, present traveling direction data 3012, and traveling link data 3013, and the present position data 3011 are data indicating present position coordinates of the vehicle, the present traveling direction data 3012 are data indicating the present traveling direction of the vehicle, and the traveling link data 3013 are data indicating the link number of a link on which the vehicle is presently traveling. The destination data 302 indicate the coordinates of a destination on a link.

The guide route data 303 are data indicating a guide route and include a route link list 3031 describing link numbers of links through which the guide route proceeds in the order of routing, and a route node list 3032 describing node numbers of nodes through which the guide route proceeds in the order of routing.

The saved destination data 304 are used for temporarily saving the destination data 302.

Revisiting FIG. 1, in this configuration, the map data read processing unit 102 reads out a desired range of the map data from the recording medium 21 through the recording medium drive 2, and stores the read-out data in the map data buffer 101 under the control of the main control unit 107.

The present state calculation unit 103 repeats the following processing.

Namely, the present state calculation unit 103 carries out processing such as map matching with a map surrounding a previously determined present position read out from the map data buffer 101 to a present position estimated based on outputs from the traveling state sensor 4 and the GPS receiver 3, thereby determining the most probable link coordinate in terms of a present position, the most probable link direction in terms of a present traveling direction, and the most probable link in terms of a link on which the vehicle is presently traveling as a present position coordinate, a present traveling direction, and a traveling link, and sets them respectively to the present position data 3011, the present traveling direction data 3012, and the traveling link data 3013 of the parameter memory 106.

The main control unit 107 receives a setting of a destination from the user through the remote controller 5 and the GUI control unit 108 according to a destination setting request of the user, and sets this destination to the destination data 302.

Then, the route search unit 104 is caused to search for a guide route to the destination indicated by the destination data 302. The route search unit 104 reads out road data of road units within a required geographical range from the map data buffer 101, calculates a guide route which ranges from the present position indicated by the present position data 3011 to destination indicated by the destination data 302 in the parameter memory 106 and proceeds starting from the link indicated by the traveling link data 3013 based on a predetermined cost model using the link costs of the link records, and stores route data of the calculated guide route respectively to the route link list 3031 and the route node list 3032 of the guide route data 303.

The main control unit 107 also repeats the following navigation image generation processing.

Namely, the main control unit 107 determines a direction corresponding to the traveling direction indicated by the present traveling direction data 3012 as a display direction, determines the scale according to user setting and initial setting carried out in advance, and a predetermined range of a neighborhood of the present position read out from the present position data 3011 is determined by the determined display direction and the determined scale as a display range. On this occasion, the display direction is calculated such that the current traveling direction always points upward.

Then, the navigation image generation unit 105 is caused to draw map display elements, strings, and facility marks indicated by drawing units based on the drawing units within the determined display range, and to draw a present position mark pointing toward the direction indicated by the present traveling direction data 3012 at a position corresponding to the present position indicated by the present position data 3011 while the determined display direction points upward. The main control unit 107 also causes the navigation image generation unit 105 to draw a guide route graphic representing the guide route from the present position to the destination indicated by the guide route data 303 within the determined display range while the determined display direction points upward when the guide route data 303 is set. The main control unit 107 further causes the navigation image generation unit 105 to draw a destination mark indicating the position of the destination when the destination is present within the display range during the route guidance.

The navigation image generation unit 105 carries out the following respective drawing according to the control by the main control unit 107, generates a navigation image, and then shows the navigation image on the display 6 through the GUI control unit 108.

Figure 4A:
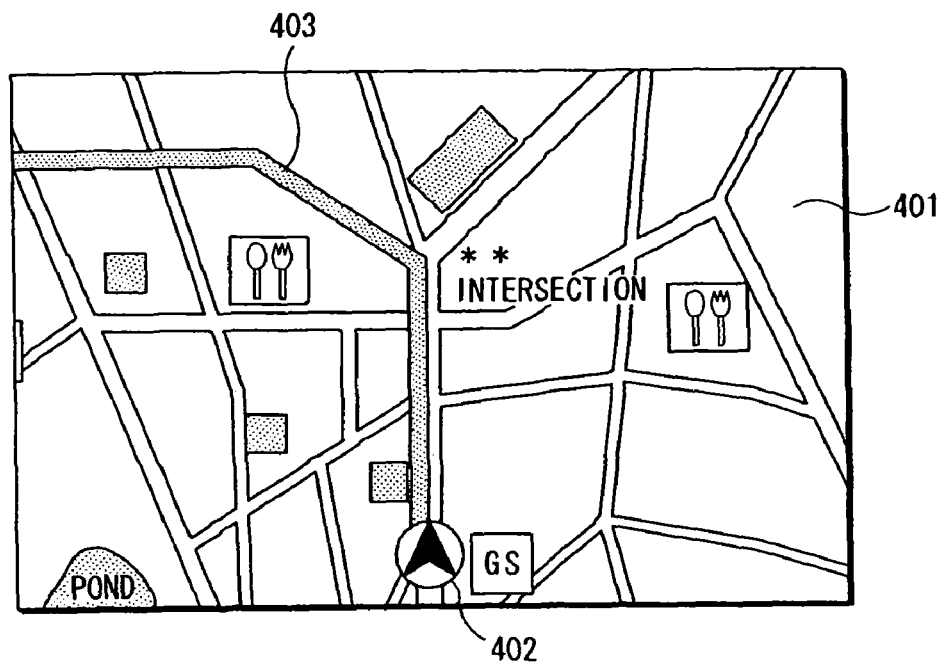
FIG. 4 shows examples of a navigation image shown on a display according to the embodiment of the present invention.
Figure 4B:
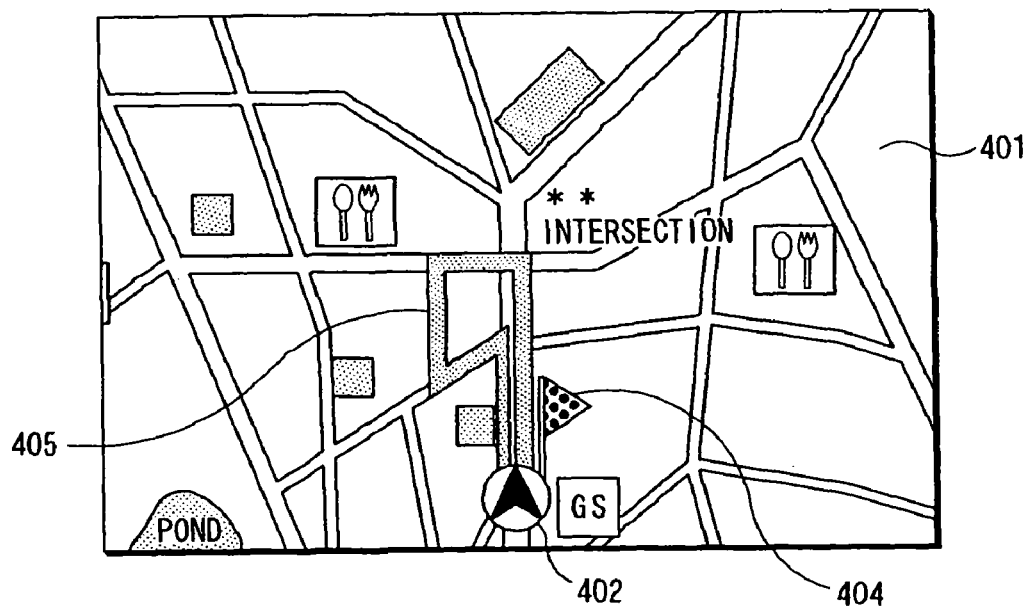

FIG. 4(*a*) shows an example of the navigation image displayed in this way, and as the figure shows, the navigation image includes a present position mark 402 and a guide route graphic 403 on a map image 401 on which map display elements and various types of strings and facility marks are shown. It should be noted that the guide route graphic 403 is not drawn if the guide route data 303 are not set, and route guidance is not carried out as described above. If the display range includes a destination, the destination mark is also displayed.

Then, the main control unit 107 monitors whether a distance between the present position indicated by the present position data 3011 and the destination indicated by the destination data 302 becomes equal to or less than a predetermined distance (such as several tens of meters or less), and if the distance becomes equal to or less than the predetermined distance, the main control unit 107 determines that the destination has been reached, clears the guide route data 303 and the destination data 302, and terminates the route guidance.

A description will now be given of return route guidance processing carried out by the above-described onboard navigation system.

Figure 5:
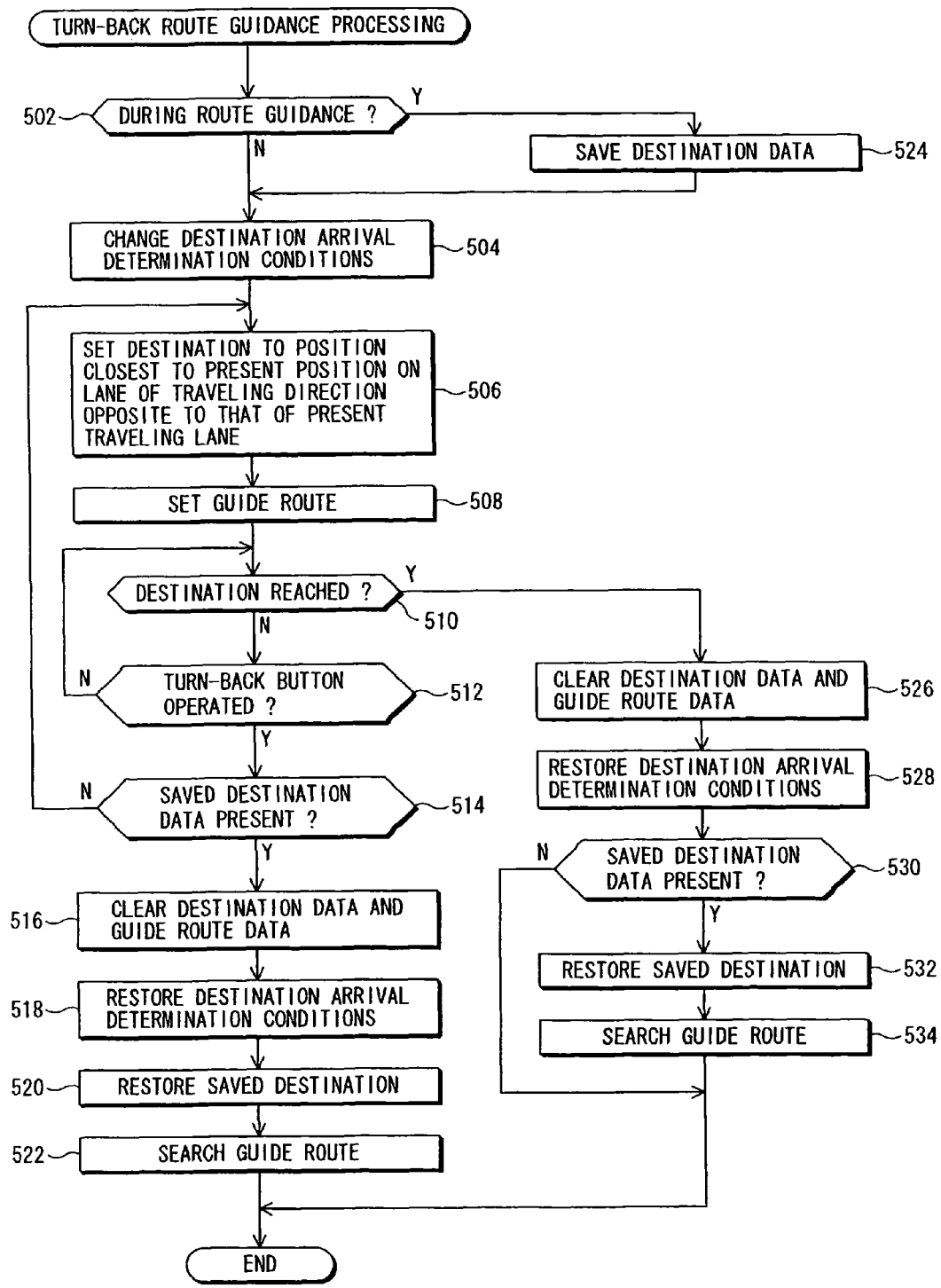
FIG. 5 is a flowchart showing return route guidance processing according to the embodiment of the present invention.

The main control unit 107 starts return route guidance processing shown in FIG. 5 if the return button 51 of the remote controller 5 is operated by the user while route guidance is being carried out, or is not being carried out.

As the figure shows, in this processing, first, it is determined whether route guidance is being carried out presently (step 502), and the procedure proceeds to step 504 if the route guidance is not being carried out, or the procedure proceeds to step 504 after saving the destination coordinates set to the destination data 302 to the saved destination data 304 (step 524) if route guidance is being carried out.

Then, in step 504, the following change is made to conditions which are used to determine whether the vehicle has reached the destination. Namely, the determination conditions for the arrival at the destination are changed such that it is not determined that the destination has been reached simply if the distance between the present position indicated by the present position data 3011 and the destination indicated by the destination data 302 is equal to or less than the predetermined distance, but it is determined that the destination has been reached if the distance between the present position indicated by the present position data 3011 and the destination indicated by the destination data 302 is equal to or less than the predetermined distance, and at the same time, the vehicle is traveling on the last link (immediately before the destination) registered to the route link list 3031 of the guide route data 303 as described above.

Figure 6A:
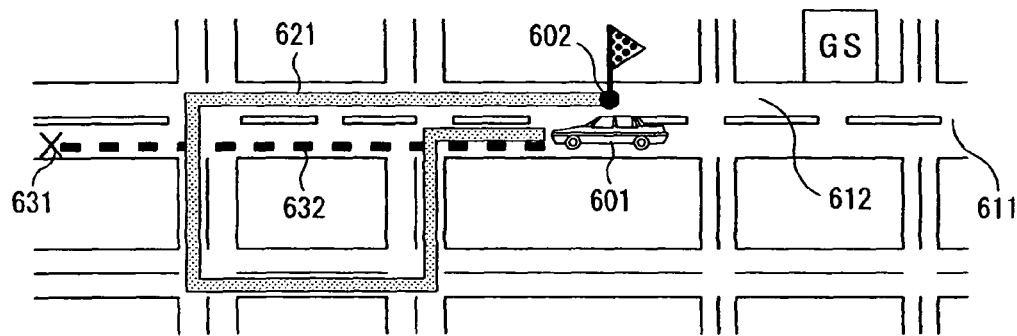
FIG. 6 shows examples of destinations and guide routes set by the return route guidance processing according to the embodiment of the present invention.
Figure 6B:
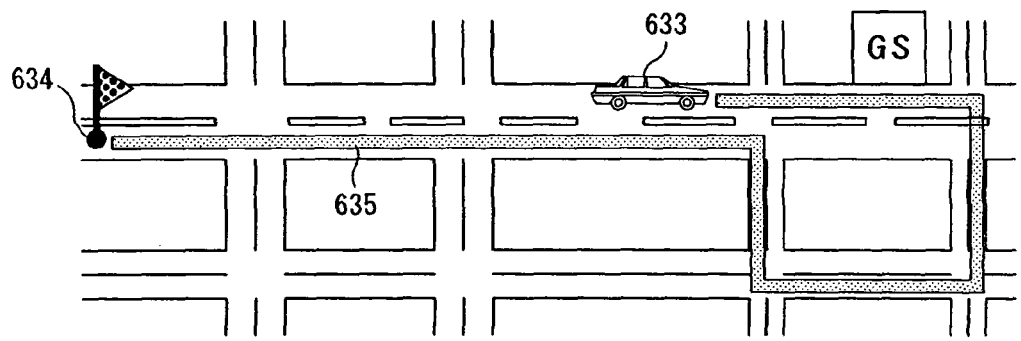

Then, for example, as FIG. 6(*a*) schematically shows, a position 602 closest to the present position 601 in a lane 612 of the traveling direction opposite to that of a present traveling lane on a present traveling path 611 is calculated as a destination (step 506) and is set to the destination data 302.

More specifically, if there exists such a link as having the start node of the link indicated by the traveling link data 3013 as the end node, and having the end node of the link indicated by the traveling link data 3013 as the start node, this link is set to the last link, and a position closest to the present position on the last link is set to the destination. Alternatively, if there does not exist a link whose nodes at both ends are common to those of the link indicated by the traveling link data 3013, a link belonging to the same path as the link indicated by the traveling link data 3013 belongs to, at the same time, having the link direction approximately opposite to that of the link indicated by the traveling link data 3013, and closest to the link indicated by the traveling link data 3013 is set to the last link, and a position closest to the present position on the last link is set to the destination.

Then, after the destination 602 is set as FIG. 6(*a*) shows, the route search unit 104 is caused to search for a guide route 621 which extends to the destination 602 indicated by the destination data 302, and finally routes the last link on which the destination is set (step 508). The route search unit 104 reads out road data of road units within a required geographical range from the map data buffer 101, calculates a guide route which extends from the present position indicated by the present position data 3011 to the destination indicated by the destination data 302 in the parameter memory 106, first routes through the link indicated by the traveling link data 3013, and finally routes through the last link based on a predetermined cost model using the link costs of the link records as described above, and stores route data of the calculated guide route respectively to the route link list 3031 and the route node list 3032 of the guide route data 303. It should be noted that the guide route may be calculated while giving priority to a route proceeding through links which belong to the traveling path, and having the road property in the link record indicating a lane used for a U-turn, namely giving priority to a route allowing a U-turn for return without requiring a change of the traveling path, or the guide route may be calculated while giving lower priority to a route requiring turns across traffic in the guide route search in the return route guide processing.

After the guide route is set in this way, the above-described navigation image generation processing and navigation image generation unit 105 in the main control unit 107 show a navigation image indicating the guide route from the present position to the position closest to the present position in the lane of the traveling direction opposite to that of the present traveling lane on the present traveling path along with the present position and the destination on the display 6, and this displayed image changes as the present position is updated. FIG. 4(*b*) shows an example of the navigation image displayed by the processing described above if the user operates the return button 51 of the remote controller 5 when the navigation image in FIG. 4(*a*) is shown, reference numeral 404 denotes the destination mark indicating the destination set closest to the present position in the lane of the traveling direction opposite to that of the present traveling lane, and reference numeral 405 denotes the guide route graphic indicating the guide route set between the present position and the destination.

After the route guidance to the destination set in step 504 is started by setting the guide route in this way, the main control unit 107 then monitors whether the destination has been reached (step 510) and whether the user has operated the return button 51 of the remote controller 5 (step 512).

On this occasion, arrival at the destination is determined if the distance between the present position indicated by the present position data 3011 and the destination indicated by the destination data 302 is equal to or less than the predetermined distance, and at the same time, the vehicle is traveling on the last link (immediately before the destination) registered to the route link list 3031 of the guide route data 303 according to the destination arrival determination conditions set in step 504. Since the determination conditions for the destination arrival are changed to include the condition relating to the link in this way, it is possible to avoid a case where the arrival at the destination is determined immediately after the start of the route guidance even if the vehicle has not moved to the lane opposite to the present traveling lane, and the route guidance hence terminates.

If it is determined that the destination has been reached in step 510, first, the destination data 302 and the guide route data 303 are cleared (step 526), and the route guidance terminates. Then, the destination arrival determination conditions are reset to the previous conditions which consider that the destination has been reached if the distance between the present position indicated by the present position data 3011 and the destination indicated by the destination data 302 is equal to or less than the predetermined distance (step 528). Then, it is determined whether there exist the destination data 302 which are being saved to the saved destination data 304 (step 530), and if the destination data 302 are not present, the return route guidance processing simply terminates. On the other hand, if there exist the destination data 302 which are being saved (step 530), the destination data 302 saved in the saved destination data 304 are restored to the destination data 302 (step 532), the route search unit 104 is caused to search for a guide route to the destination indicated by the destination data 302, and if the route search unit 104 stores route data of the guide route to the restored destination in the route link list 3031 and the route node list 3032 of the guide route data 303 (step 534), the return route guidance processing terminates.

After the guide route is set in this way, the above-described navigation image generation processing and navigation image generation unit 105 of the main control unit 107 show a navigation image indicating the guide route from the present position to the destination which was set in the destination data 302 when the return route guidance processing started along with the present position and the destination on the display 6, and this displayed image changes as the present position is updated.

Thus, for example, if the user operates the return button 51 when the guide route 632 is set with a position 631 shown in FIG. 6(*a*) as the destination, and the route guidance according to the guide route is being carried out, the return route guidance processing consequently starts using the guide route 621 with the position 602 as a destination as described above. When the vehicle reaches a position 633 where it is determined that the destination 602 set by the return route guidance processing has been reached as FIG. 6(*b*) shows, the position 631 which is the original destination is automatically set to a destination 634 again, a guide route 635 to the destination 634 is set, and route guidance along the guide route 635 subsequently starts.

Consequently, for example, if the user operates the return button 51 for filling fuel at a passed gas station on a lane opposite to a traveling lane when the user is traveling while receiving route guidance to a final destination, and as a result, receives the route guidance to the opposite lane, after arriving at the destination on the opposite lane set in the return route guidance processing, the onboard navigation system automatically starts the route guidance from a position at that moment to the final destination using the traveling path at that moment.

On the other hand, if the operation of the return button 51 is detected in step 512, it is first determined whether the saved destination data 302 is present in the saved destination data 304 (step 514), and if the saved destination data 302 is not present, the procedure simply returns to the processing from step 506. On the other hand, if the saved destination data 302 is present, the destination data 302 and the guide route data 303 are cleared (step 516), and the destination arrival determination conditions are reset to the original conditions which consider that the destination has been reached if the distance between the present position indicated by the present position data 3011 and the destination indicated by the destination data 302 is equal to or less than the predetermined distance (step 518).

Then, the destination data 302 saved in the saved destination data 304 are restored to the destination data 302 (step 520), the route search unit 104 is caused to search for a guide route to the destination indicated by the destination data 302, and if the route search unit 104 stores route data of the guide route to the restored destination in the route link list 3031 and the route node list 3032 of the guide route data 303 (step 522), the return route guidance processing terminates.

After the guide route is set in this way, the above-described navigation image generation processing and navigation image generation unit 105 of the main control unit 107 show a navigation image indicating the guide route from the present position to the destination which was set in the destination data 302 when the return route guidance processing started along with the present position and the destination on the display 6, and this displayed image changes as the present position is updated.

Figure 6C:
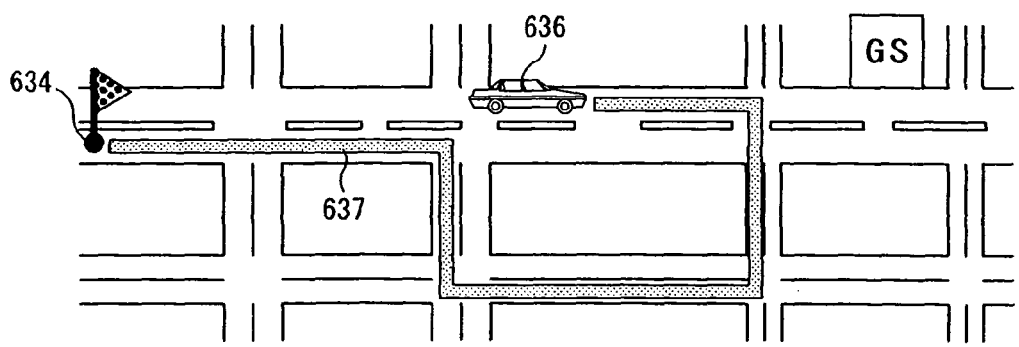

Thus, for example, if the user operates the return button 51 when the guide route 632 is set with the position 631 shown in FIG. 6(*a*) as the destination, and the route guidance is being carried out according to the guide route, the return route guidance processing consequently starts using the guide route 621 with the position 602 as the destination. When the user operates the return button 51 again at the position 636 before the vehicle reaches the destination 602 set by the return route guide processing, the position 631 which is the original destination is automatically set to the destination 634 again, a guide route 637 to the destination 634 is set, and route guidance along the guide route 637 subsequently starts as FIG. 6(c) shows.

Consequently, for example, if the user operates the return button 51 for filling fuel at a gas station found on the side of a lane opposite to the traveling lane when the user is traveling while receiving route guidance to the final destination, and as a result, receives route guidance to the opposite lane, it is possible to press the return button 51 after filling the fuel, and to cause the onboard navigation system to start again the route guidance from a position at that moment to the final destination.

The above section has described the return route guidance processing.

In the return route guidance processing described above, though after the conditions for determining the arrival at the destination are changed in step 504, the position closest to the present position on the lane in the traveling direction opposite to that of the present traveling lane on the present traveling path is set to the destination in step 506, the processing may be changed in the following way.

Figure 7A:
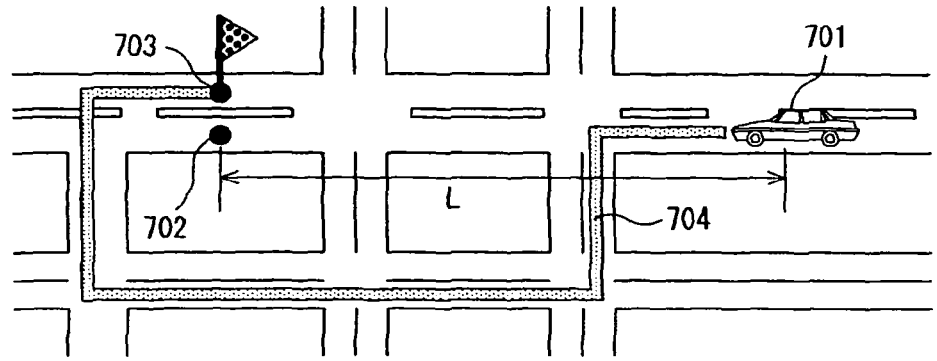
FIG. 7 shows examples of destinations and guide routes set by return route guidance processing according to embodiments of the present invention.

Namely, the processing for changing the destination arrival determination conditions may not be carried out in steps 504, 518, and 528. Rather, a position 703, which is closest to an ahead position 702 separated by a distance L from the present position 701 in the present traveling lane on the present traveling path, and exists in the lane of the traveling direction opposite to that of the present traveling lane on the present traveling path, may be set to the destination as shown in FIG. 7(a) in step 504, and a guide route 704 to the destination 703 may be set in step 508 in the return route guidance processing in FIG. 5. On this occasion, the distance L is a distance satisfying K<L while it is considered that the destination is reached if the distance between the present position and the destination is equal to or less than K.

Additionally, the destination set in the above-described return route guidance processing may be set as described below.

Figure 7B:
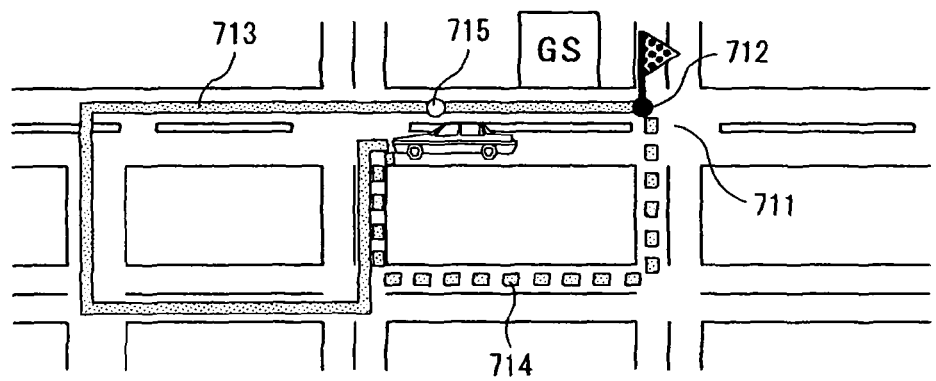

Namely, as shown in FIG. 7(b), a position 712 before the last intersection 711 passed in the lane of the traveling direction opposite to that of the present traveling lane on the present traveling path may be set to the destination in step 504, and a guide route 713 to the destination 712 may be set in step 508.

Alternatively, the intersection 711 itself passed last on the present traveling path may be set to the destination in step 504. It should be noted that in this case it is preferable that a position 715 closest to the present position in the lane of the traveling direction opposite to that of the present traveling lane is set to a through position in order to prevent a route such as one indicated by numeral 714 which does not return on the present traveling path from being set as a guide route, and the route search unit 104 is caused to search for a guide route to the destination 711 through the through position 715 in step 508.

In this way, if the user travels straight at an intersection at which the user should have turned left or right, the user can immediately receive the route guidance for returning to that intersection by simply operating the return button 51.

Figure 7C:
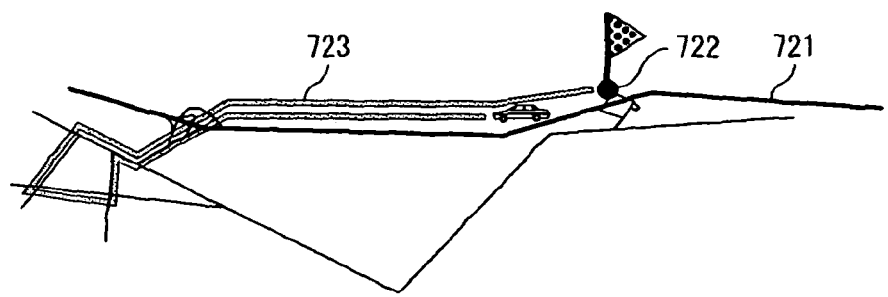

In a similar way, the destination set in step 504 of the return route guidance processing may be an expressway exit 722 passed last on an expressway 721 during expressway travel as shown in FIG. 7(c) (if different traveling directions have different expressway exits, the expressway exit may be on the lane opposite to the present traveling lane), and a route returning to the expressway exist 722 passed last may be searched for as a guide route 723 in step 508. In this case, the route search unit 104 may be caused to search for the guide route such that a route using expressways is given priority in step 508.

In this way, in such a case that the user has passed an exit of an expressway by mistake, the user can receive route guidance for a route which proceeds to a local road at the next expressway exit, returns to a lane opposite to the previous lane of the expressway, and returns to the expressway exit which the user has passed by simply operating the return button 51.

As described above, according to the present invention, it is possible to guide a user along a route for moving into a lane opposite to a present traveling lane without requiring complicated operation of the user.

What is claimed is:

1. An onboard vehicle navigation system comprising:
    a map data storage unit for storing a road as a set of links, wherein each link has an associated traveling direction;
    a guidance request reception unit for receiving a predetermined return route guidance request operation of a user;
    a return route calculation unit for automatically calculating a route from a present vehicle position in a present traveling lane of a road on a present traveling path, corresponding to a road link having a first traveling direction, to a position in an opposite lane of the road, corresponding to a road link having a second traveling direction opposite to that of the first traveling direction, as a return guide route when said guidance request reception unit receives the predetermined return route guidance request operation; and
    a return route guidance unit for guiding the user according to the return guide route calculated by said return route calculation unit.

2. The navigation system according to claim 1, further comprising:
    an input apparatus comprising a button for receiving the return route guidance request operation of the user,
    wherein said guidance request reception unit receives the return route guidance request operation of the user according to the operation of said button by the user.

3. The navigation system according to claim 1, wherein said return route calculation unit comprises:
    a return destination setting unit for setting a position closest to the present position in the lane of the traveling direction opposite to that of the present traveling lane on the present traveling path as a return destination when said guidance request reception unit receives the return route guidance request operation, and
    a return route search unit for calculating a route to the return destination set by said return destination setting unit as said return guide route.

4. The navigation system according to claim 3, wherein said route guidance unit continues providing travel guidance for the user according to the return guide route calculated by said return route calculation unit until the distance between the present position and the return destination set by said return destination setting unit is equal to or less than a predetermined distance, and the present position is a position in the lane on which said return destination is set.

5. The navigation system according to claim 1, wherein said return route calculation unit comprises:
    a return destination setting unit for setting the last intersection passed on the present traveling path as a return destination when said guidance request reception unit receives the return route guidance request operation, and
    a return route search unit for calculating a route to the return destination set by said return destination setting unit as said return guide route.

6. The navigation system according to claim 1, wherein said return route calculation unit comprises:
   a return destination setting unit for setting a position in the lane of the traveling direction opposite to that of the present traveling lane before the last intersection passed on the present traveling path as a return destination when said guidance request reception unit receives the return route guidance request operation, and
   a return route search unit for calculating a route to the return destination set by said return destination setting unit as said return guide route.

7. The navigation system according to claim 1, wherein said return route calculation unit comprises:
   a return destination setting unit for setting the last exit passed on a presently traveled expressway as a return destination during travel on an expressway when said guidance request reception unit receives the return route guidance request operation, and
   a return route search unit for calculating a route to the return destination set by said return destination setting unit as said return guide route.

8. The navigation system according to claim 1, further comprising:
   a route guidance unit for searching for a route to a destination set by the user as a guide route, and guiding the travel of the user according to the searched guide route; and
   a destination restoration processing unit for stopping the travel guidance by said route guidance unit if said guidance request reception unit receives the return route guidance request operation while said route guidance unit is carrying out the travel guidance according to said guide route, and to carry out the travel guidance for the user according to the searched guide route after completion of the travel guidance for the user according to the return guide route by said return route guidance unit.

9. The navigation system according to claim 1, further comprising:
   a route guidance unit for searching for a route to a destination set by the user as a guide route, and guiding the travel of the user according to the searched guide route; and
   a destination restoration processing unit for stopping the travel guidance by said route guidance unit if said guidance request reception unit receives the predetermined return route guidance request operation while said route guidance unit is carrying out the travel guidance according to said guide route, and subsequently resuming the travel guidance for the user according to the searched guide route if a request for restoration of the destination is received from the user.

10. A method of operating an onboard vehicle navigation system, comprising:
    storing a road as a set of links, wherein each link has an associated traveling direction;
    receiving a predetermined return route guidance request operation of a user;
    automatically calculating a route from a present vehicle position in a present traveling lane of a road on a present traveling path, corresponding to a road link having a first traveling direction, to a position in an opposite lane of the road, corresponding to a road link having a second traveling direction opposite to that of the first traveling direction, as a return guide route when the predetermined return route guidance request operation is received; and
    guiding the user according to said return guide route.

11. The method according to claim 10 wherein said return route guidance request operation by the user is received according to the operation of a single button.

12. The method according to claim 10 wherein said return guide route is calculated by setting a position closest to the present position in the lane of the traveling direction opposite to that of the present traveling lane on the present traveling path as a return destination, and searching for a route to the set return destination.

13. The method according to claim 10 wherein said return guide route is calculated by setting the last intersection passed on the present traveling path as a return destination, and searching for a route to the set return destination.

14. The method according to claim 10 wherein said return guide route is calculated by setting the last exit passed on an expressway as a return destination during travel on an expressway, and searching for a route to the set return destination.

15. The method according to claim 10 further comprising:
    storing a destination of a route of route guidance if the return route guidance request operation is received from the user while the route guidance is being provided to the user; and
    searching for a route from the present position to the stored destination in a predetermined timing, and starting route guidance for the searched route.

16. A computer program read and executed by an onboard vehicle navigation system, wherein said computer program is caused to execute:
    storing a road as a set of links, wherein each link has an associated traveling direction;
    receiving a predetermined return route guidance request operation of a user;
    automatically calculating a route from a present vehicle position in a present traveling lane of a road on a present traveling path, corresponding to a road link having a first traveling direction, to a position in an opposite lane of the road, corresponding to a road link having a second traveling direction opposite to that of the first traveling direction, as a return guide route when the predetermined return route guidance request operation is received; and
    guiding the user according to said return guide route.

17. The computer program according to claim 16 wherein said return route guidance request operation by the user is received according to the operation of a single button.

18. The computer program according to claim 16 wherein said return guide route is calculated by searching for a route to a position closest to the present position in the lane of the traveling direction opposite to that of the present traveling lane on the present traveling path.

19. A recording medium for storing a computer program read and executed by an onboard vehicle navigation system, wherein said computer program causes said navigation system to execute:
    a step of storing a road as a set of links, wherein each link has an associated traveling direction;
    a step of receiving a predetermined return route guidance request operation of a user;
    a step of automatically calculating a route from a present vehicle position in a present traveling lane of a road on a present traveling path, corresponding to a road link having a first traveling direction, to a position in an opposite lane of the road, corresponding to a road link having a second traveling direction opposite to that of the first traveling direction, as a return guide route when the predetermined return route guidance request operation is received; and a step of guiding the user according to said return guide route.

20. The recording medium according to claim 19 wherein said return route guidance request operation by the user is received according to the operation of a single button.

21. The recording medium according to claim 19 wherein said return guide route is calculated by searching for a route to a position closest to the present position in the lane of the traveling direction opposite to that of the present traveling lane on the present traveling path.

* * * * *